(12) United States Patent
Takeuchi

(10) Patent No.: US 8,011,489 B2
(45) Date of Patent: Sep. 6, 2011

(54) STRADDLE-TYPE VEHICLE

(75) Inventor: Yoshihiko Takeuchi, Shizuoka (JP)

(73) Assignee: Yamaha Hatsudoki Kabushiki Kaisha, Iwata-shi (JP)

( * ) Notice: Subject to any disclaimer, the term of this patent is extended or adjusted under 35 U.S.C. 154(b) by 767 days.

(21) Appl. No.: 11/945,920

(22) Filed: Nov. 27, 2007

(65) Prior Publication Data

US 2008/0125285 A1     May 29, 2008

(30) Foreign Application Priority Data

Nov. 28, 2006   (JP) .................................. 2006-320470

(51) Int. Cl.
*F16H 48/06* (2006.01)
(52) U.S. Cl. ..................................... 192/85.5; 192/3.58
(58) Field of Classification Search .................. 192/3.58
See application file for complete search history.

(56) References Cited

U.S. PATENT DOCUMENTS

| | | | | | |
|---|---|---|---|---|---|
| 5,267,635 | A | * | 12/1993 | Peterson et al. | 192/90 |
| 2006/0124422 | A1 | * | 6/2006 | Zenno | 192/3.61 |
| 2008/0078641 | A1 | * | 4/2008 | Iwashita et al. | 192/48.2 |

FOREIGN PATENT DOCUMENTS

| | | |
|---|---|---|
| EP | 1 826 087 A1 | 8/2007 |
| EP | 1 826 440 A1 | 8/2007 |
| EP | 1 826 441 A1 | 8/2007 |
| JP | 2000-205396 | 7/2000 |
| JP | 2004-076897 | 3/2004 |
| JP | 2005-248976 * | 9/2005 |

* cited by examiner

*Primary Examiner* — Sherry Estremsky (74) *Attorney, Agent, or Firm* — Rabin & Berdo, PC (57) ABSTRACT

An automatic change gear control device for a motorcycle having a manually operated clutch operation member achieves both easy clutch operation and secure freedom of drive. A clutch is connected and disconnected to change gears in a transmission capable of freely changing gears in plural stages. A clutch actuator drives the clutch. A clutch operation unit has a manually-operated clutch lever. An ECU controls the clutch actuator based on driver operation of the clutch lever.

8 Claims, 9 Drawing Sheets

STRADDLE-TYPE VEHICLE

RELATED APPLICATIONS

This application claims the benefit of priority under 35 USC 119 of Japanese patent application no. 2006-320470, filed on Nov. 28, 2006, which application is hereby incorporated by reference in its entirety.

BACKGROUND OF THE INVENTION

1. Field of the Invention

The invention relates to a straddle-type vehicle.

2. Description of Related Art

Conventionally, a vehicle comprising a transmission with plural transmission gears is known. A clutch is connected and disconnected in a change gear operation of the transmission. A clutch operation member, such as a clutch lever, for driver operation of the clutch and a change gear operation member, such as a shift pedal, for operating the transmission are usually provided.

The clutch operation member and the clutch, and the change gear operation member and the transmission, are often connected through a mechanical power transmitting mechanism such as a link, a rod and a wire. Manipulating force of a driver is transmitted to the clutch and the transmission via the power transmitting mechanism.

Use of an actuator such as an electric motor to connect and disconnect the clutch or change transmission gears has recently been attempted. For example, an actuator to generate an assist force to reduce a load of a driver operating the clutch has been proposed.

JP-A-2000-205396 discloses a sensor for detecting depression of a clutch pedal in an automobile and an actuator for changing the engaging force of the clutch based on a detection signal from the sensor.

JP-A-2004-76897 discloses a motorcycle including a wire (a mechanical power transmitting mechanism) for connecting a clutch lever and a clutch and a power transmitting mechanism for connecting a shift pedal and a transmission. An actuator for connecting and disconnecting the clutch and an actuator for changing transmission gears are separately provided. Clutch and change gear operations can be optionally switched between manual and automatic operations.

However, these prior art actuators only generate assist force for reducing the manipulating force of the clutch and do not change a characteristic of the clutch.

Further, the vehicle of JP-A-2000-205396 is an automobile and the clutch operation member is a stepping-type pedal. A driver cannot carry out a sensitive operation since the pedal is operated by means of a foot. In a straddle-type vehicle such as a motorcycle, by contrast, a driver tends to attach more importance to manipulating performance and sometimes carries out a subtle operation to quickly or substantially change the movement of the motorcycle.

The vehicle of JP-A-2004-76897 provides switching between a manual mode and an automatic mode. This enables secure freedom of drive or easy operation to be achieved, based on the assumption that a driver attaching importance to manipulating performance (freedom of drive) selects the manual mode while a driver preferring to avoid trouble or difficulty in operation (in other words, a driver preferring easy operation) selects the automatic mode. However, fixed easiness of operation and fixed freedom of drive cannot be simultaneously achieved since the manual and automatic modes are alternatively selected. Thus, operation remains troublesome in manual mode while freedom of drive is lost in automatic mode.

SUMMARY OF THE INVENTION

In view of the above, an object of the invention is to simultaneously achieve easy clutch operation and secure freedom of drive in a straddle-type vehicle having a manually-operated clutch operation member.

A change gear control device in accordance with the invention comprises a transmission capable of freely changing gears in plural stages. A clutch is connected and disconnected in changing gears in the transmission. A drive device drives the clutch. A clutch operation member is operated manually, and a control device controls the drive device based on operation of the clutch operation member.

Movement of a clutch has conventionally been uniformly fixed only by operation of a clutch operation member since the clutch operation member is connected to the clutch via a mechanical power transmitting mechanism. In the change gear control device of the invention, however, the control device controls a drive device based on driver operation of the clutch operation member to connect and disconnect the clutch. Control by a control device thus exists between clutch operation by a driver and movement of the clutch, thereby simultaneously achieving easy clutch operation and secure freedom of drive.

In accordance with the invention, easy clutch operation and secure freedom of drive are simultaneously achieved in a straddle-type vehicle having a manually-operated clutch operation member.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
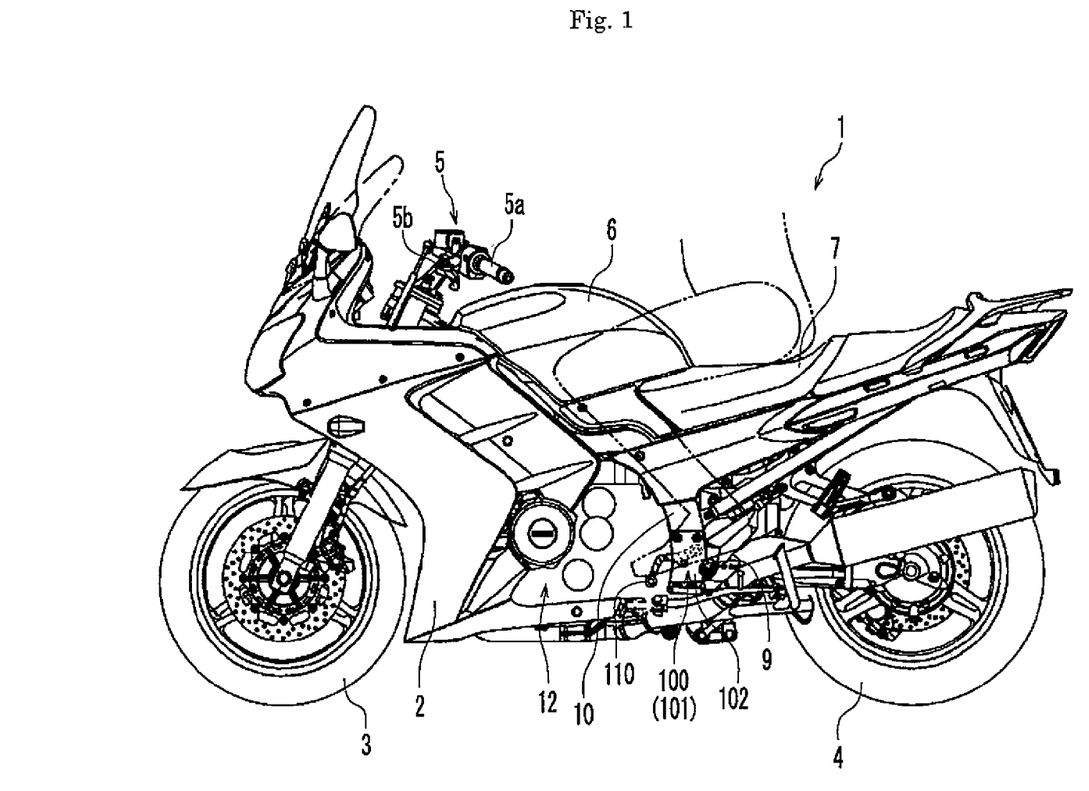
FIG. 1 is a side view of a motorcycle according to the invention.

An embodiment of the invention is now described with reference to the drawings. FIG. 1 is a side view of a motorcycle 1 in accordance with an embodiment of the invention. Front-rear and left-right directions in the following description are front-rear and left-right directions from the perspective of a driver straddling motorcycle 1.

Motorcycle 1 is a sport type motorcycle having a large cowling 2, a front wheel 3, a rear wheel 4, a handle 5, a fuel tank 6 and a seat 7. An engine unit 12 held by a body frame 10 is provided under fuel tank 6 and seat 7. Engine unit 12, includes a transmission 43 capable of freely changing gears in plural stages and a clutch 44 that is connected and disconnected in changing gears (refer to FIG. 4).

A clutch lever 5b is provided on a front side of a left grip 5a of handle 5 provided on a top end of a handle bar 20. Clutch lever 5b is urged to the front side (the right side in FIG. 2) by means, for example, of a spring. An angle sensor 21 on a root side of clutch lever 5b measures a rotation angle of clutch lever 5b to detect a position of clutch lever 5b. Clutch operation unit 200 comprises lever 5b and angle sensor 21.

Figure 2:
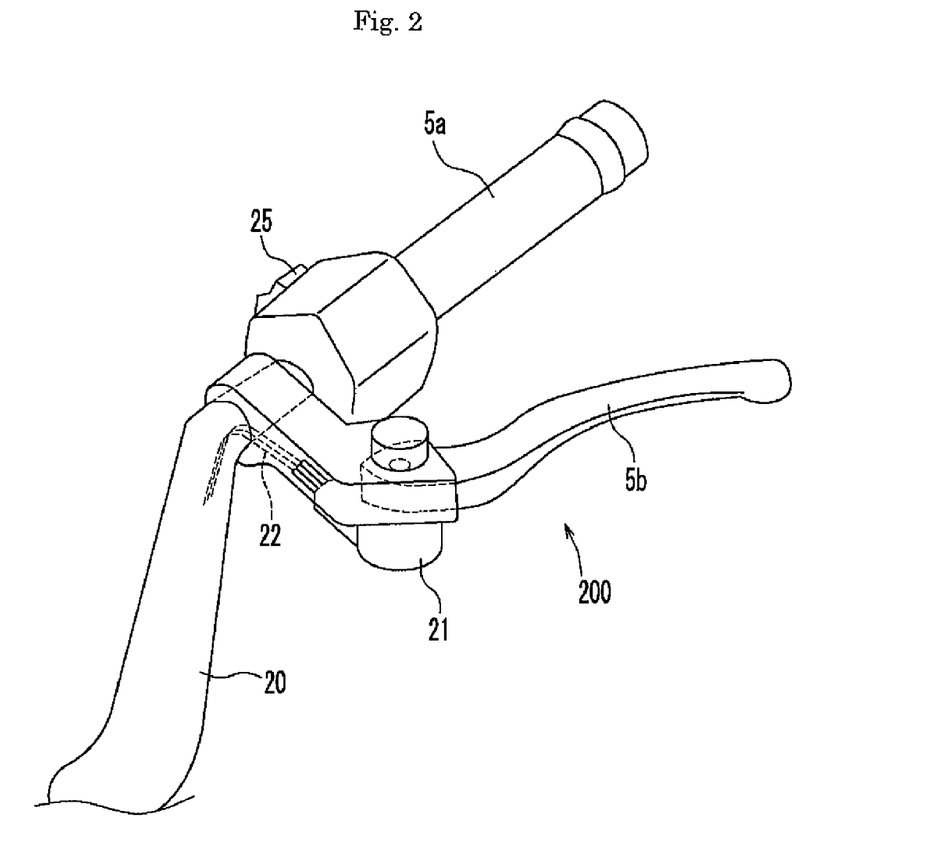
FIG. 2 is a perspective view of a left grip of a handle of the motorcycle.
Figure 3:
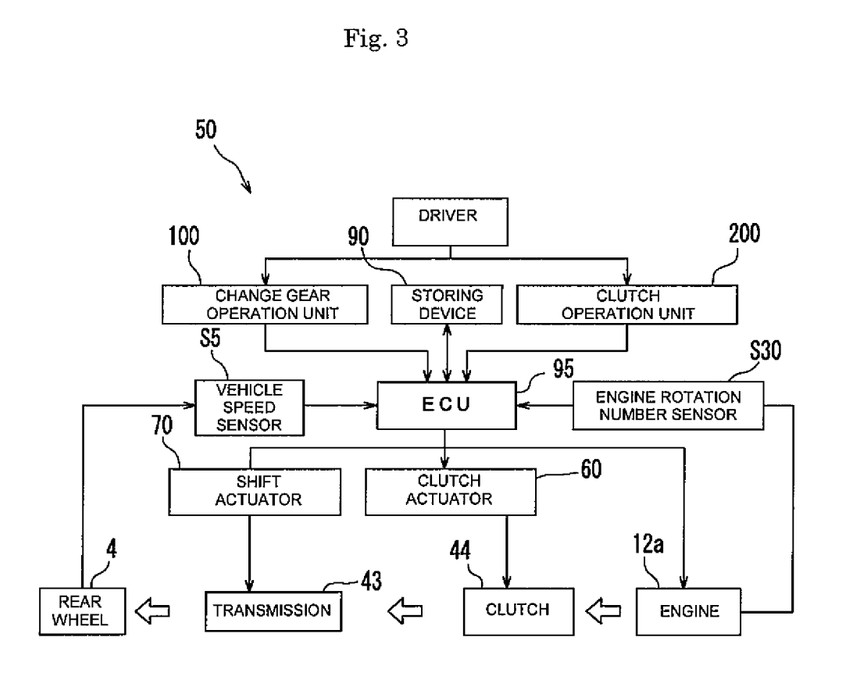
FIG. 3 is a block diagram of an automatic change gear control device of the motorcycle.

As shown in FIG. 3, clutch operation unit 200 (including angle sensor 21) is connected to engine control device or unit (ECU) 95 through a signal line 22 (FIG. 2). A detection signal from angle sensor 21 is sent to ECU 95. ECU 95 controls a clutch actuator 60 on the basis of the signal. For example, a clutch operation signal is sent from clutch operation unit 200 to ECU 95 when angle sensor 21 detects that a driver pulls clutch lever 5b by a predetermined quantity (in other words, that clutch lever 5b rotates by a predetermined angle or more). ECU 95 receives the signal and drives clutch actuator 60 to connect and disconnect clutch 44.

A change gear operation unit 100 for operating transmission 43 is provided on a bottom side of the left surface of motorcycle 1 (in the vicinity of a driver's left foot, which performs a change gear operation), as shown in FIG. 1.

FIG. 3 is a block diagram of an automatic change gear control device 50 of motorcycle 1. Automatic change gear control device 50 connects and disconnects clutch 44 and changes the transmission gears of transmission 43 by means of clutch actuator 60 and a shift actuator 70 in accordance with an operation by a driver. A signal is sent from clutch operation unit 200 and change gear operation unit 100 to ECU 95 when a driver operates clutch operation unit 200 and change gear operation unit 100. On the basis of the signal or the signal and a drive state of motorcycle 1 (such as a vehicle speed detected by a vehicle speed sensor S5 and/or an engine rotation number detected by an engine rotation number sensor S30, for example), ECU 95 sends a control signal to clutch actuator 60 and shift actuator 70. As a result, clutch actuator 60 connects and disconnects clutch 44, and shift actuator 70 causes transmission 43 to change gears.

A detailed structure of clutch 44 is described with reference to FIG. 4. Clutch 44, which is a so-called multiple disk friction clutch, comprises a clutch housing 443, plural friction disks 445 provided into one body with clutch housing 443, a clutch boss 447, plural clutch plates 449 fitted into clutch boss 447 and a pressure plate 451. Torque is transmitted from a crank shaft 31 to clutch housing 443 through a gear 310 and a gear 441. A spring 450 urges a pressure plate 451 in a direction to connect clutch 44 (leftward in FIG. 4).

Figure 4:
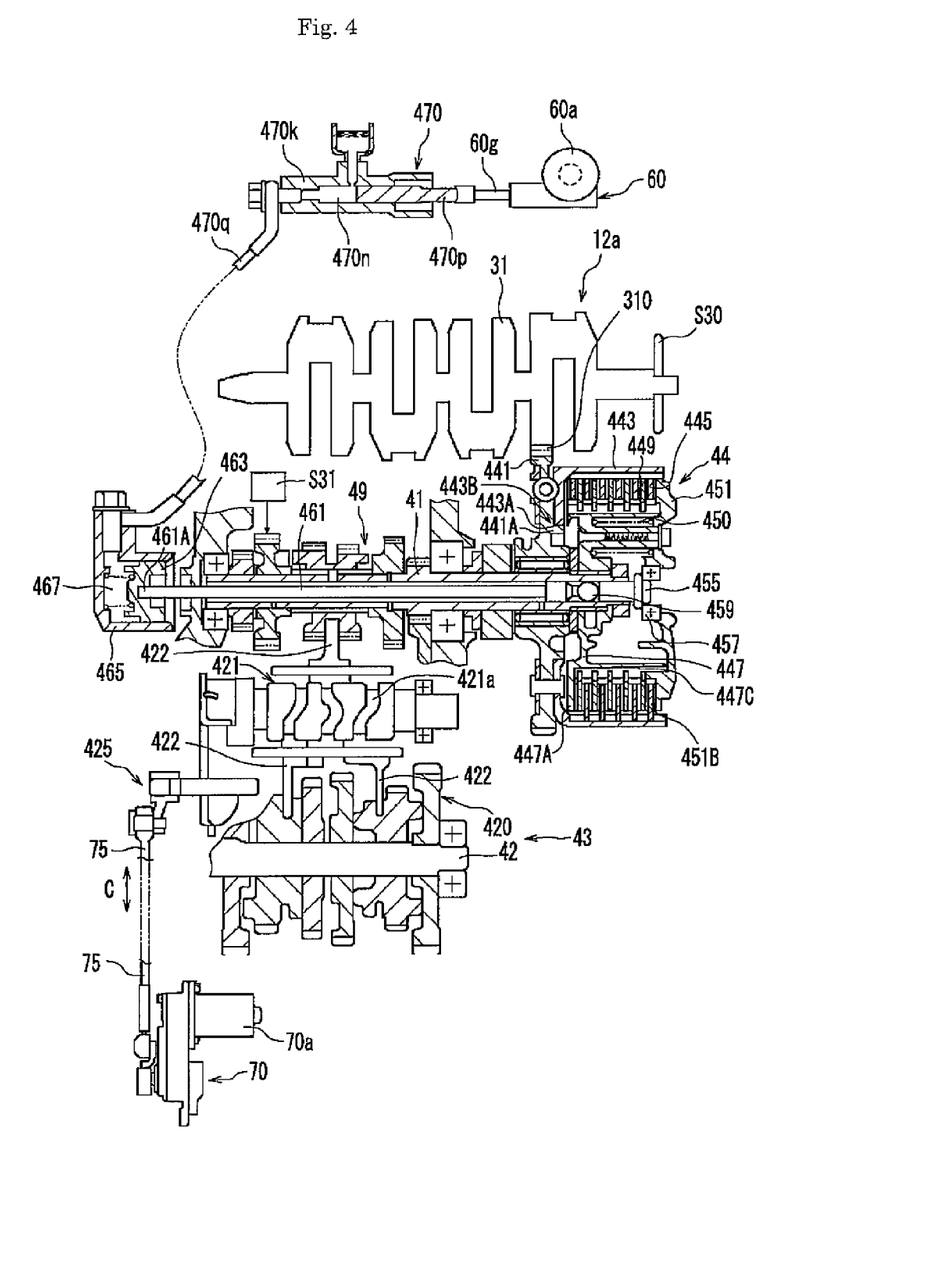
FIG. 4 is a partial cross-sectional view of a main part of an engine unit of the motorcycle.

As shown in FIG. 4, clutch actuator 60 comprises an electric motor 60a. A hydraulic cylinder 470 provided between electric motor 60a and clutch 44 amplifies drive force of electric motor 60a to be transmitted to clutch 44. Alternatively, clutch actuator 60 may drive clutch 44 only by means of electric motor 60a.

A power transmitting mechanism between clutch actuator 60 and clutch 44 is now described. Pressure plate 451 of clutch 44 is interlocked with an end side (right side in FIG. 4) of a push rod 455 through a bearing 457 and is freely rotatable with respect to push rod 455. A spherical ball 459 is provided in a cylindrical main shaft 41 adjacent to the other end side (left end) of push rod 455. A push rod 461 is provided on the left side of ball 459.

An end 461A of push rod 461 projects from the other end of cylindrical main shaft 41. A piston 463 provided on projected end 461A of push rod 461 is guided by a cylinder main body 465 to be freely slidable in an axial direction of main shaft 41. Oil is supplied in a space 467 surrounded by piston 463 and cylinder main body 465.

When clutch 44 is changed from a state of connection to disconnection, electric motor 60a is driven and an output shaft 60g is moved leftward in FIG. 4. Movement of output shaft 60g pushes a piston 470p of hydraulic cylinder 470 leftward. Oil in an oil chamber 470n of a cylinder main body 470k then passes through an oil hose 470q into space 467, which causes rightward movement of piston 463.

Rightward movement of piston 463 allows pressure plate 451 to be pushed rightward in FIG. 4 through push rod 461, ball 459, push rod 455 and bearing 457. When the force pushing pressure plate 451 rightward is larger than the force of spring 450 urging pressure plate 461 leftward, pressure plate 451 moves rightward. A pressure part 451B of pressure plate 451 then moves away from a friction disk 445, causing disconnection of clutch 44.

Change of clutch 44 from a disconnected to a connected state is now described. When clutch 44 is disconnected, piston 463 pushes pressure plate 451 rightward through push rod 461, ball 459, push rod 455 and bearing 457 to keep pressure plate 451 away from friction disk 445. Even under such a condition, pressure plate 451 is still urged leftward by spring 450. Accordingly, piston 463 is urged leftward through bearing 457, push rod 455, ball 459 and push rod 461.

Piston 470p of hydraulic cylinder 470 is urged rightward by oil flowing in oil hose 470q since piston 463 is urged leftward. When electric motor 60a is driven from a state of disconnection of clutch 44 and output shaft 60g is gradually moved rightward, piston 470p also moves rightward. The movement of piston 470p allows oil to flow into oil chamber 470n from space 467 via oil hose 470q.

The movement of oil gradually moves piston 463 urged by pressure plate 451 and spring 450 leftward. In accordance with the above, pressure plate 451 also moves leftward gradually. After clutch 44 starts connection (starts transmitting power) and pressure plate 451 further moves leftward, the urging force of spring 450 increases the friction force between friction disk 445 and clutch plate 449. As a result, a slide between friction disk 445 and clutch plate 449 is almost lost to complete connection of the clutch.

ECU 95 (FIG. 3) executes the above-described operation of clutch actuator 60 in response to driver operation of clutch lever 5b.

The structure of transmission 43 is now described. Transmission 43 is a so-called dog clutch type transmission and comprises plural transmission gears 49 mounted to main shaft 41. Transmission gears 49 on main shaft 41 engage with transmission gears 420 mounted to drive shaft 42 (they are, however, separately drawn in FIG. 4). Any one or both of transmission gears 49 and 420 other than a selected pair of transmission gears is mounted so as to be idling (racing) with respect to main shaft 41 or drive shaft 42. Accordingly, drive force from main shaft 41 to drive shaft 42 is transmitted only through a selected pair of transmission gears.

A shift operation for selecting transmission gear 49 and transmission gear 420 to change a speed change ratio is carried out by means of a shift cam 421, which is a shift input shaft. Shift cam 421 has plural cam grooves 421a. Shift forks 422 are mounted to cam grooves 421a. Shift forks 422 are interlocked with predetermined transmission gears 49 and predetermined transmission gears 420 of main shaft 41 and drive shaft 42, respectively. Rotation of shift cam 421 allows cam groove 421a to guide shift fork 422 so that shift fork 422 moves in respective axial directions. Only a pair of transmission gear 49 and transmission gear 420 located at positions corresponding to a rotation angle of shift cam 421 then becomes fixed with respect to main shaft 41 and drive shaft 42 by a spline, respectively. This allows positions of the transmission gears to be fixed and the speed change ratio to be fixed. Transmission of rotation force is then performed between main shaft 41 and drive shaft 42 through transmission gears 49 and transmission gears 420. A reference mark S31 in FIG. 4 denotes a drive shaft rotation sensor. A reference mark 12a denotes an engine.

Shift actuator 70 comprises an electric motor 70a. A shift link mechanism 425 is provided between shift actuator 70 and transmission 43. Shift actuator 70 reciprocates a shift rod 75 in a direction shown by an arrow C and rotates shift cam 421 by a predetermined angle through shift link mechanism 425. This moves shift fork 422 by a predetermined quantity in the axial direction in accordance with cam groove 421a. A pair of transmission gear 49 and transmission gear 420 is then made fixed to main shaft 41 and drive shaft 42 one after another to transmit rotation drive force at respective reduction speed ratios.

Change gear operation unit 100 is now described with reference to FIGS. 5 and 6. Change gear operation unit 100 includes a substantially square base plate 102 that is detachably mounted to body frame 10 (or engine unit 12) by screws through mounting holes 105A, 105B, 105C and 105D.

A foot-operated operation part 101 is mounted to base plate 102. A footrest mount part 103 for rotatably mounting a footrest 9 (FIG. 1) is formed on base plate 102. Operation part 101 has a shirt pedal 110. One end 112A of shift pedal 110 is rotatably mounted to an inner surface side of base plate 102 (a side facing the vehicle body) and the other end 112B is mounted to a foot-operated pedal part 114 (FIG. 6). End 112A of arm part 112 is mounted to boss part 104 of base plate 102 through a screw member 108 in the vicinity of footrest 9 (in other words, in the vicinity of footrest mount part 103). End 112A is freely rotatable (able to swing up and down) with screw member 108 used as a rotation shaft. Top end 112B of arm part 112 is provided with a pressurized pedal part 114 for receiving a load of a foot.

A detection part 120 is provided on the outer surface side of base plate 102. Detection part 120 comprises a potentiometric sensor 122 (a rotation or angle sensor, which is formed from a potentiometer having a variable resistance element). Potentiometric sensor 122 detects that shift pedal (movable part) 110 moves by a predetermined quantity or more in accordance with an operation by a foot. A sensor main body 123 of potentiometric sensor 122 is fixed to base plate 102. A rotation plate 124 is mounted to sensor main body 123 so as to be freely rotatable. Rotation of rotation plate 124 allows movement (rotation) of shift pedal 110 toward a predetermined direction to be detected. A signal of the detection is sent to ECU 95.

Figure 5:
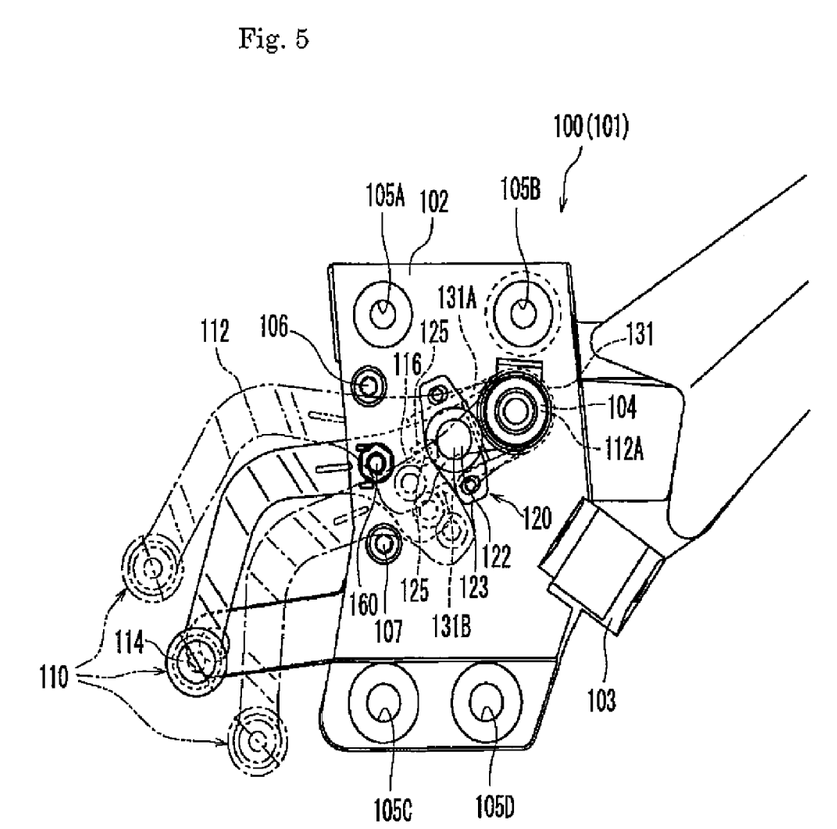
FIG. 5 is a side view of a shift pedal and surrounding structure of the motorcycle.
Figure 6:
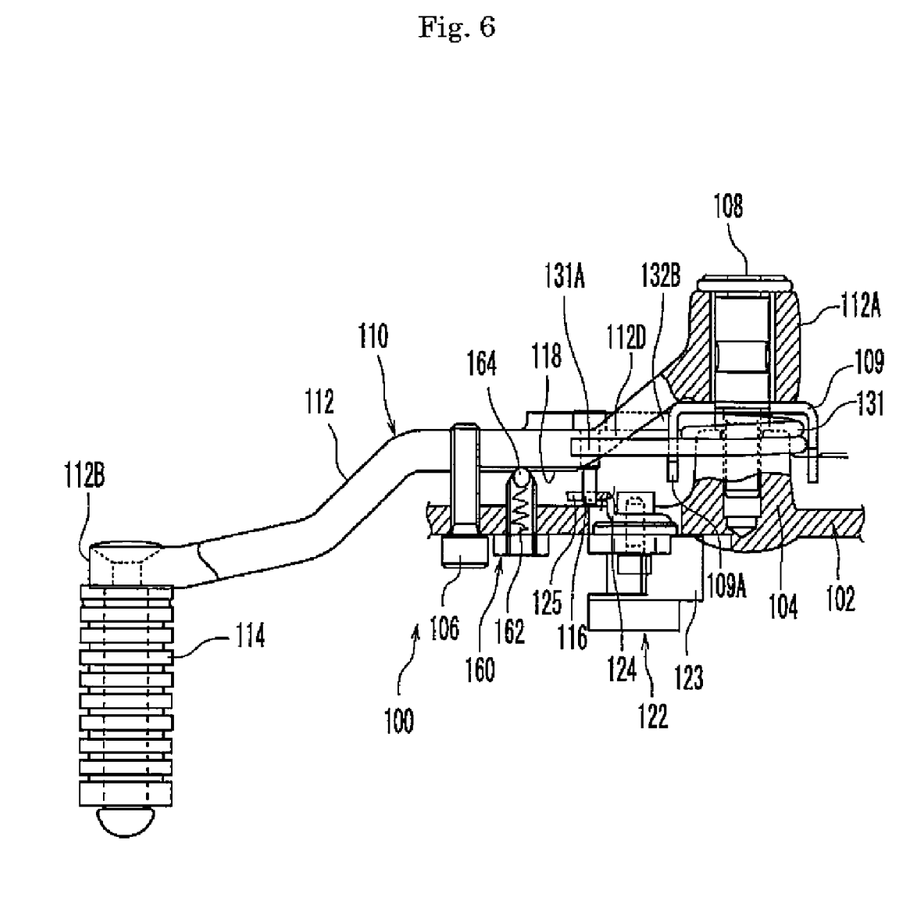
FIG. 6 is a cross-sectional view of the shift pedal and surrounding structure.

An engaging notch 125 is formed in rotation plate 124 as shown in FIGS. 5 and 6. An engaging pin 116 projectingly provided to shift pedal 110 is inserted into engaging notch 125. Rotation plate 124 is rotated through engaging pin 116 when shift pedal 110 rotates.

A V-shaped spring 131 is provided on the inner surface side of base plate 102. Spring 131 is formed from a metal bar whose center part is wound several times and which has an acute angle between both straight end parts. Spring 131 is a "return mechanism" for returning shift pedal 110 to a fixed neutral position.

Spring 131 includes a pair of support rods (straight end parts) 131A and 131B for generating spring elasticity. A pressure part 112D of arm part 112 of shift pedal 110 and an engaging piece 109A of a retainer 109 are provided between support rods 131A and 131B. Retainer 109 is fixed to boss part 104 of base plate 102. Pressure part 112D is formed in a folded part of arm part 112. The width of pressure part 112D is same as that of the other part.

Two stopper pins 106 and 107 are mounted to base plate 102. Rising stopper pin 106 is mounted at a position to contact an upper edge of shift pedal 110 to limit upward rotation of shift pedal 110 to a predetermined quantity, as shown by a double dotted line in FIG. 5. Falling stopper pin 107 is mounted at a position to contact a lower edge of shift pedal 110 to limit downward rotation of shift pedal 110 to a predetermined quantity, as shown by a single dotted line in FIG. 5.

Base plate 102 is provided with a manipulating force variable mechanism comprising a plunger 160. As shown in FIG. 6, a coil spring 162 is inserted in a cylindrical main body of plunger 160. A movable ball 164 held by spring 162 is mounted at the top end of plunger 160. When movable ball 164 is pressured with a predetermined force or more in the axial direction of the cylindrical main body, spring 162 is drawn back due to the pressure. As a result, movable ball 164 is drawn back to the inner side of the cylindrical main body. On the other hand, when the pressure is removed, spring 162 extends due to the elasticity, so that movable ball 164 returns to an original position of the top end of plunger 160.

The manipulating force variable mechanism further comprises two insertion grooves formed in shift pedal 110 to correspond to plunger 160. Insertion grooves 118 are formed in places where insertion of movable ball 164, which is a top end of plunger 160, into insertion groove 118 can be achieved when shift pedal 110 rotates (swings) in a vertical direction in accordance with an operation by a foot from a fixed neutral position (solid line position in FIG. 5) to a "shifting down body sense signal generating position" (single dotted line position) and a "shifting up body sense signal generating position" (double dotted line position).

That is to say, movable ball 164 is in contact with a wall surface of shift pedal 110 (arm part 112) by pressure at a fixed neutral position and its peripheral positions. This pressure causes a predetermined torque on a foot operating shift pedal 110 (namely, a left foot carrying out a gear change operation). When shift pedal 110 moves to the shifting down or shifting up body sense signal generation position, movable ball 164 is inserted into insertion groove 118. The torque necessary for moving shift pedal 110 changes in an instant in this insertion. The torque also changes in an instant when movable ball 164 is once fixed in insertion groove 118. A driver recognizes such a change of torque as a sense of a click through feeling in his or her foot.

When potentiometric sensor 122 detects that a driver operates shift pedal 110 with his or her foot to rotate rotation plate 124 in the shifting-up direction by a predetermined quantity, a shifting up command signal is sent from change gear operation unit 100 to ECU 95. A shift down command signal is sent from change gear operation unit 100 to ECU 95 when potentiometric sensor 122 detects that rotation plate 124 rotates in the shifting-down direction by a predetermined quantity. ECU 95 drives shift actuator 70 so that transmission 43 carries out a shifting-up operation when ECU 95 receives the shifting up command signal and a shifting-down operation when ECU 95 receives the shifting down command signal.

According to the invention, clutch characteristics for operation of clutch lever 5b can be changed freely. The clutch characteristics include (1) lever manipulating force (including reaction force); (2) clutch stroke; and (3) transmission torque for position of the clutch lever. Providing an electric brake, which is built in angle sensor 21 (refer to FIG. 2) of clutch lever 5b, to generate operation resistance, for example, allows the reaction force of the lever manipulating force to be created so that the reaction force has an optional characteristic. Examples of modification of the clutch characteristics are now described.

<Example of Modification of a Clutch Characteristic 1>

Figure 7:
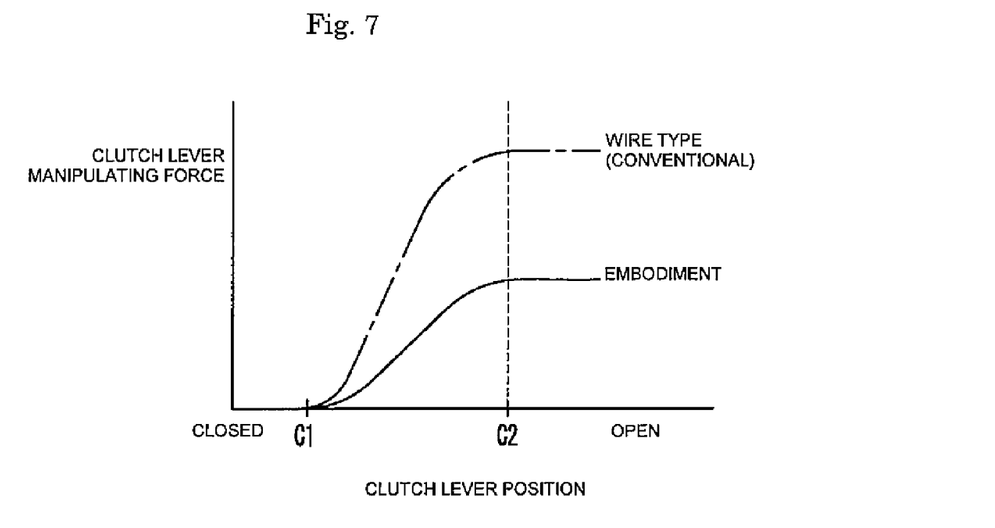
FIG. 7 is a graph of a clutch characteristic according to the invention.

For a driver preferring reduced load (force necessary for operation=manipulating force) without changing the feeling of manipulation of clutch lever 5b, the manipulating force of clutch lever 5b may be uniformly reduced by a predetermined percentage (50%, for example) relative to a conventional wire type clutch system (a system in which a clutch lever and a clutch are connected through a wire), as shown in FIG. 7. The manipulating force of clutch lever 5b is reduced without changing a clutch lever position C1 from which disconnection of clutch 44 starts and a clutch lever position C2 from which disconnection of clutch 44 ends. That is, the manipulating force of clutch lever 5b is reduced without changing regular movement of clutch 44 for operation of clutch lever 5b. An operation that feels the same but with less load can thereby be performed, achieving both easy clutch operation and secure freedom of drive.

<Example of Modification of a Clutch Characteristic 2>

Figure 8:
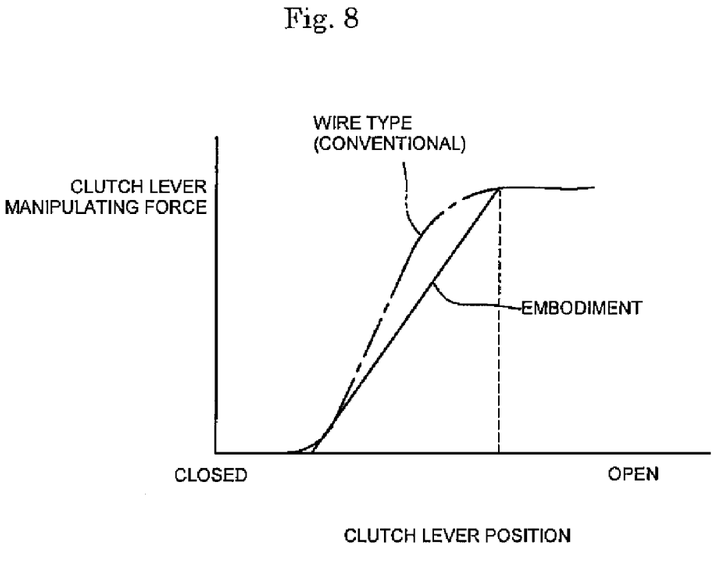
FIG. 8 is a graph of another clutch characteristic according to the invention.

A manipulation feeling may be achieved that could not be obtained before. For example, as shown in FIG. 8, a load at a last stage of a grip of clutch lever 5b may be set the same as before while a load at a first stage of the grip is set smaller than before. Moreover, as shown in FIG. 8, the manipulating force of clutch lever 5b may be set to be proportional to the rotation angle thereof within a predetermined range of position (a range other than so-called play, for example) of clutch lever 5b.

<Example of Modification of a Clutch Characteristic 3>

Figure 9:
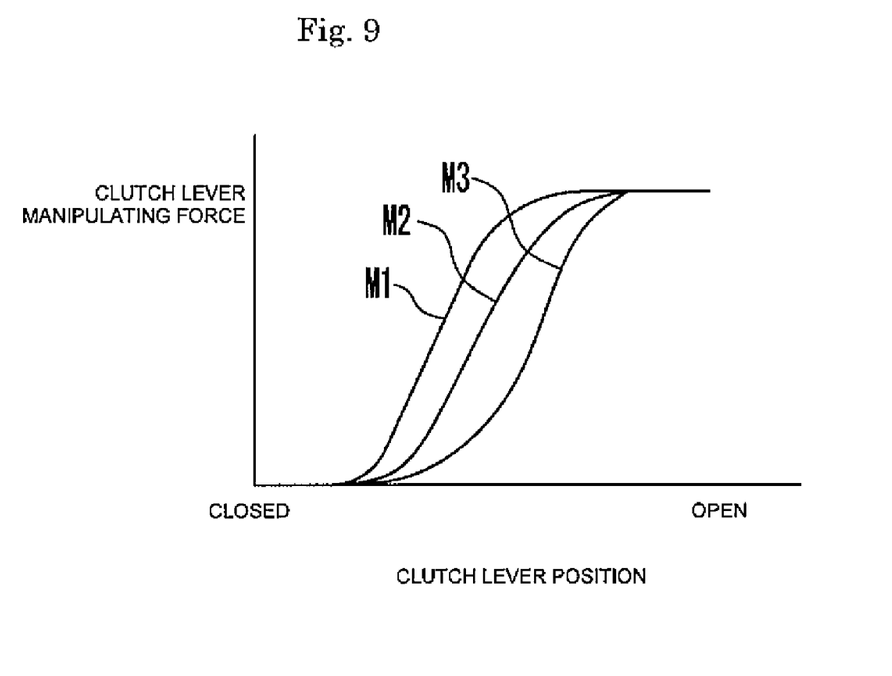
FIG. 9 is a graph of another clutch characteristic according to the invention.

Plural clutch characteristics (such as M1, M2 and M3 shown in FIG. 9, for example) may be stored in a storage device 90 (FIG. 3) of automatic change gear control device 50 in advance so that a driver can manually select any one of the clutch characteristics. An input device such as a switch 25 (FIG. 2) may be provided on handle 5. A "linear mode" in which a clutch characteristic in the conventional wire type clutch system is achieved, and a "friendly mode" in which clutch lever 5b is regarded simply as an ON/OFF switch and a grip of clutch lever 5b automatically causes disconnection of clutch 44 at a predetermined speed, may be provided. A driver attaching importance to freedom of drive rather than ease of clutch operation, for example, would select "linear mode" while a driver attaching importance to ease of clutch operation rather than freedom of drive would select "friendly mode". Both drivers can thereby achieve a personally suitable clutch operation.

In addition, ECU 95 may change the clutch characteristic on the basis of a drive state detected by a drive state detection device. Parameters indicating the state of drive may include, for example, accelerator grip (throttle) position, vehicle speed, gear stage and the number of engine rotations. Drive state detection devices for detecting such parameters include, for example, an accelerator grip or throttle position sensor, vehicle speed sensor S5, a gear position sensor and an engine rotation number sensor S30.

When clutch lever 5b is suddenly returned when the number of rotations of the engine is high, for example, switching clutch 44 from a disconnected to a connected state may be carried out more slowly more to reduce shock in changing gears. Or, when clutch lever 5b is suddenly returned when the number of rotations of the engine is low, switching clutch 44 from a disconnected to a connected state may be carried out more slowly to avoid a stop of the engine. Moreover, switching clutch 44 from a disconnected to a connected state may be carried out more slowly to prevent the number of rotations of the engine from suddenly rising when clutch 44 is disconnected and the driver suddenly pulls clutch lever 5b while the accelerator is open.

Plural clutch characteristics may also be stored in storage device 90 in so that ECU 95 can control clutch actuator 60 based on detection results of the drive state detection device, so that clutch 44 can operate with any clutch characteristic for operation of clutch lever 5b.

In accordance with the invention, not only can a change of relation between a lever angle of clutch lever 5b and a load be achieved, but an effect of a nonlinear actual stroke may also be achieved. For example, the characteristic may be increased in resolving power in the vicinity of an engaging point, which is a clutch stroke position from which clutch 44 starts transmitting the transmission torque, and otherwise decreased in resolving power. The vicinity of the engaging point is a range where the transmission torque for a clutch stroke suddenly changes and operation by a manual clutch lever is difficult. A clutch characteristic that is more easily handled is thus achieved. Setting a clutch stroke for a lever stroke at 1:0.6, for example, in the vicinity of the engaging point achieves subtle stroke adjustment and improves ease of handling.

In accordance with the invention, a manually-operated clutch operation member (clutch lever 5b) and a drive device for driving clutch 44 (clutch actuator 60) are provided to control the drive device based on driver operation of the clutch operation member. Accordingly, changing contents of control allows both of easiness of a clutch operation and secure freedom of drive to be achieved.

Further, the invention provides an operation member position sensor (angle sensor 21) for detecting a position of a clutch operation member (clutch lever 5b) to control the drive device in accordance with the position of the clutch operation member. The position of the clutch operation member can be subtly changed since it is manually operated. Accordingly, controlling the drive device in accordance with the position of the clutch operation member allows subtle control in accordance with subtle operation by a driver to be achieved, so that manipulating performance is improved.

According to the invention, not only is a reduction of manipulating force in a clutch operation achieved, a free change of a clutch characteristic is also achieved. Accordingly, a clutch characteristic corresponding to a driver's taste, a drive state of motorcycle 1 or the like allows feeling in riding to be improved.

Moreover, according to the invention, a clutch characteristic can be changed based on a detection result by a drive state detection device. This allows the clutch operation to be more easily performed and improves the feeling in riding.

In addition, storing plural clutch characteristics in storing device 90 in advance for selection by an input device (switch 25) achieves both ease of clutch operation and secure freedom of drive with a comparatively simple structure.

On the other hand, storing plural clutch characteristics in storing device 90 in advance for automatic selection by ECU 95 in accordance with a drive state further improves ease of clutch operation.

Furthermore, according to the invention, the drive device (shift actuator 70) is controlled based on driver operation of an operation member (shift pedal) to execute a predetermined operation (gear change) not only for a clutch operation but also for a shift operation. Accordingly, various kinds of control can be achieved for both the clutch and shift operation. Combination of the above allows both easy operation and secure freedom of drive in the whole operation of a shift change to be achieved to a high degree.

The method of controlling the drive device based on operation of the clutch operation member is not limited to control in accordance with a position of the clutch operation member. The drive device may be controlled in accordance with a load of the clutch operation member, for example.

Swing type clutch lever 5b has been described as an example of a clutch operation member in accordance with the invention. However, the clutch operation member is not limited to swing type clutch lever 5b and may be another operation member such as a slide type lever or a button type operation member. In the case of a button type operation member, a position of the clutch operation member is defined on the basis of a push (stroke) quantity of a button.

Further, shift pedal 110 has been described as an example of a transmission operation member in accordance with the invention. However, the transmission operation member is not limited to a swing type operation member such as shift pedal 110 and may be a button type operation member or the like formed from two buttons on the toe side and the heel side.

Angle sensor 21 for detecting a rotation angle of clutch lever 5b has been described as an example of an operation member position sensor for detecting a position of the clutch operation member. However, the operation member position sensor is not limited to angle sensor 21 and may be a sensor or the like for detecting a distance of movement of the top end of clutch lever 5b. Moreover, it may be also possible to provide clutch lever 5b with a clutch wire to detect a position of clutch lever 5b on the basis of a moving quantity of the clutch wire.

As described above, the present invention provides a change gear control device in a straddle-type vehicle.

The particular embodiments of the invention described in this document should be considered illustrative, rather than restrictive. Modification to the described embodiments may be made without departing from the spirit of the invention as defined by the following claims.

The invention clamed is:
1. A straddle-type vehicle comprising:
a transmission that freely changes gears in plural stages;
a clutch that is connected and disconnected to change gears in the transmission;
a drive device that drives the clutch;
a manually-operated clutch operation member that is not mechanically connected to the drive device; and
a control device that electrically controls the drive device based on operation of the clutch operation member.

2. The straddle-type vehicle according to claim 1, comprising:
an operation member position sensor that detects a position of the clutch operation member,
wherein the control device controls the drive device in accordance with a position of the clutch operation member detected by the operation member position sensor.

3. The straddle-type vehicle according to claim 1,
wherein the control device can freely change a clutch characteristic for operation of the clutch operation member.

4. The straddle-type vehicle according to claim 3, comprising:
a drive state detect device for detecting a drive state of the straddle-type vehicle,
wherein the control device changes the clutch characteristic based on a detection result of the drive state detect device.

5. The straddle-type vehicle according to claim 3, comprising:
a storing device for storing predetermined clutch characteristics; and
an input device for selecting one or more of the clutch characteristics,
wherein the control device controls the drive device to achieve clutch characteristics selected by the input device.

6. The straddle-type vehicle according to claim 3, comprising:
a drive state detect device for detecting a drive state of the straddle-type vehicle; and
a storing device for storing predetermined clutch characteristics,
wherein the control device selects one or more of the clutch characteristics based on a detection result of the drive state detect device to control the drive device to achieve the selected clutch characteristic.

7. The straddle-type vehicle according to claim 1, comprising:
a transmission drive device that drives the transmission; and
a transmission operation member that operates the transmission,
wherein the control device controls the transmission drive device based on operation of the transmission operation member.

8. The straddle-type vehicle according to claim 7,
wherein the clutch operation member is a clutch lever; and
the transmission operation member is a shift pedal.

* * * * *